(12) United States Patent
Eagle

(10) Patent No.: US 7,084,210 B2
(45) Date of Patent: Aug. 1, 2006

(54) HEAT ACTIVATED EPOXY ADHESIVE AND USE IN A STRUCTURAL FOAM INSERT

(75) Inventor: Glenn G. Eagle, Bloomfield Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 144 days.

(21) Appl. No.: 10/738,668

(22) Filed: Dec. 17, 2003

(65) Prior Publication Data

US 2004/0131839 A1 Jul. 8, 2004

Related U.S. Application Data

(60) Provisional application No. 60/436,888, filed on Dec. 27, 2002.

(51) Int. Cl.
C08L 63/00 (2006.01)
C08L 33/12 (2006.01)
C08J 9/00 (2006.01)

(52) U.S. Cl. ............. 525/119; 525/107; 525/523; 525/529; 525/530; 525/533; 523/400; 521/178

(58) Field of Classification Search ............. None
See application file for complete search history.

(56) References Cited

U.S. PATENT DOCUMENTS

| | | |
|---|---|---|
| 2,866,744 A | 12/1958 | Askey et al. ............. 208/65 |
| 3,581,681 A | 6/1971 | Newton ................. 108/51 |
| 3,755,212 A | 8/1973 | Dunlap et al. ....... 260/2.5 BD |
| 3,821,130 A | 6/1974 | Barron et al. ........ 260/2.5 BD |
| 3,849,146 A | 11/1974 | Walters et al. ............ 96/107 |
| 3,859,162 A | 1/1975 | Johnson et al. ......... 428/318.6 |
| 4,017,117 A | 4/1977 | Eggert et al. .......... 296/146.6 |
| 4,019,301 A | 4/1977 | Fox ..................... 52/725 |
| 4,390,645 A | 6/1983 | Hoffman et al. ........... 521/137 |
| 4,451,518 A | 5/1984 | Miura et al. ............ 296/146.6 |
| 4,751,249 A | 6/1988 | Wycech .................. 521/54 |
| 4,769,391 A | 9/1988 | Wycech .................. 521/54 |
| 4,813,690 A | 3/1989 | Coburn, Jr. .............. 277/205 |
| 4,874,650 A | 10/1989 | Kitoh et al. ................ 428/68 |
| 4,898,630 A | 2/1990 | Kitoh et al. ............... 156/79 |
| 4,997,951 A | 3/1991 | Bagga .................... 548/352 |
| 5,076,632 A | 12/1991 | Surratt .................. 296/205 |
| 5,102,188 A | 4/1992 | Yamane ............... 296/203.03 |
| 5,213,391 A | 5/1993 | Takagi .................. 296/205 |
| 5,218,792 A | 6/1993 | Cooper ............... 296/203.03 |
| 5,266,133 A | 11/1993 | Hanley et al. ............. 156/71 |
| 5,274,006 A * | 12/1993 | Kagoshima et al. ......... 521/85 |
| 5,344,208 A | 9/1994 | Bien et al. ................ 296/187 |
| 5,373,027 A | 12/1994 | Hanley et al. ........... 521/84.1 |
| 5,506,025 A | 4/1996 | Otto et al. ................ 428/98 |
| 5,533,781 A | 7/1996 | Williams ................ 296/204 |
| 5,545,361 A | 8/1996 | Rosasco ................. 264/45.2 |
| 5,609,385 A | 3/1997 | Daniel et al. ........... 296/203.01 |
| 5,648,401 A | 7/1997 | Czaplicki et al. ........... 521/85 |
| 5,660,428 A | 8/1997 | Catlin ................. 296/203.01 |
| 5,720,510 A | 2/1998 | Daniel et al. .......... 296/203.01 |
| 5,725,272 A | 3/1998 | Jones ................... 296/208 |
| 5,806,919 A | 9/1998 | Davies .................. 296/205 |
| 5,857,734 A | 1/1999 | Okamura et al. ....... 296/187.12 |
| 5,866,052 A | 2/1999 | Muramatsu .............. 264/46.6 |
| 5,871,253 A | 2/1999 | Erber .................. 296/146.6 |
| 5,884,960 A | 3/1999 | Wycech ................ 296/146.6 |
| 5,888,600 A | 3/1999 | Wycech ................ 428/35.9 |
| 5,968,995 A | 10/1999 | Rizk et al. ............... 521/159 |
| 5,985,435 A | 11/1999 | Czaplicki et al. ........... 428/323 |
| 6,003,274 A | 12/1999 | Wycech .................. 52/232 |
| 6,040,350 A | 3/2000 | Fukui ................... 521/135 |
| 6,050,579 A | 4/2000 | Selland et al. ............. 296/204 |
| 6,058,673 A | 5/2000 | Wycech ................ 52/721.4 |
| 6,062,624 A | 5/2000 | Crabtree et al. ........... 296/39.3 |
| 6,068,424 A | 5/2000 | Wycech .................. 403/269 |
| 6,079,180 A | 6/2000 | Wycech ............... 296/203.01 |
| 6,092,862 A | 7/2000 | Kuwahara ............... 296/204 |
| 6,092,864 A | 7/2000 | Wycech et al. ........... 296/204 |
| 6,096,403 A | 8/2000 | Wycech ................. 428/122 |
| 6,099,948 A | 8/2000 | Paver .................. 428/304.4 |
| 6,131,897 A | 10/2000 | Barz et al. ............... 269/207 |
| 6,135,542 A | 10/2000 | Emmelmann et al. . 296/203.01 |
| 6,146,566 A | 11/2000 | Beeck et al. .............. 264/101 |
| 6,149,227 A | 11/2000 | Wycech ................. 296/188 |
| 6,150,428 A | 11/2000 | Hanley, IV et al. ......... 521/135 |
| 6,164,716 A | 12/2000 | Palazzolo et al. ........ 296/146.6 |
| 6,165,588 A | 12/2000 | Wycech ................. 428/122 |
| 6,168,226 B1 | 1/2001 | Wycech ................ 296/146.6 |
| 6,189,953 B1 | 2/2001 | Wycech ................. 296/188 |
| 6,196,619 B1 | 3/2001 | Townsend et al. ....... 296/146.6 |
| 6,199,940 B1 | 3/2001 | Hopton et al. ............. 296/187 |
| 6,218,442 B1 | 4/2001 | Hilborn et al. ............. 521/85 |
| 6,233,826 B1 | 5/2001 | Wycech ................. 29/897.1 |
| 6,237,304 B1 | 5/2001 | Wycech ................. 52/731.6 |

(Continued)

FOREIGN PATENT DOCUMENTS

DE      10163253 A1    12/2001

(Continued)

OTHER PUBLICATIONS

Derwent 2002-449608, JP 2002127938.

(Continued)

*Primary Examiner*—Michael J. Feely

(57) ABSTRACT

An expandable adhesive for a structural foam insert useful for vehicular reinforcement is described. The adhesive is characterized by containing a viscosity enhancing agent such as a polymethylmethacrylate, which results in a cured adhesive having unusually small voids and unusually high Young's modulus.

12 Claims, No Drawings

U.S. PATENT DOCUMENTS

| | | |
|---|---|---|
| 6,247,287 B1 | 6/2001 | Takabatake ................ 52/731.6 |
| 6,253,524 B1 | 7/2001 | Hopton et al. ............. 52/731.2 |
| 6,270,600 B1 | 8/2001 | Wycech ........................ 156/79 |
| 6,272,809 B1 | 8/2001 | Wycech ................... 52/731.6 |
| 6,276,105 B1 | 8/2001 | Wycech ................... 52/309.8 |
| 6,281,260 B1 | 8/2001 | Hanley, IV et al. .......... 521/135 |
| 6,287,666 B1 | 9/2001 | Wycech ...................... 428/122 |
| 6,296,298 B1 | 10/2001 | Barz .......................... 296/187 |
| 6,305,136 B1 | 10/2001 | Hopton et al. ............. 52/309.7 |
| 6,311,452 B1 | 11/2001 | Barz et al. ................ 52/735.1 |
| 6,332,731 B1 | 12/2001 | Wycech ...................... 403/171 |
| 6,346,573 B1 | 2/2002 | White ......................... 525/121 |
| 6,348,513 B1 | 2/2002 | Hilborn et al. .............. 521/95 |
| 6,357,819 B1 | 3/2002 | Yoshino ..................... 296/189 |
| 6,376,564 B1 | 4/2002 | Harrison ...................... 521/54 |
| 6,378,933 B1 | 4/2002 | Schoen et al. ........ 296/203.02 |
| 6,387,470 B1 | 5/2002 | Chang et al. ............... 428/121 |
| 6,406,078 B1 | 6/2002 | Wycech ...................... 293/120 |
| 6,413,611 B1 | 7/2002 | Roberts et al. ............... 428/99 |
| 6,419,305 B1 | 7/2002 | Larsen ................... 296/203.03 |
| 6,422,575 B1 | 7/2002 | Czaplicki et al. ........... 277/628 |
| 6,423,755 B1 | 7/2002 | Allen et al. ................. 521/111 |
| 6,451,231 B1 | 9/2002 | Harrison et al. ........... 264/45.3 |
| 6,455,126 B1 | 9/2002 | Wycech ...................... 428/122 |
| 6,455,144 B1 | 9/2002 | Wycech ................... 428/308.4 |
| 6,467,834 B1 | 10/2002 | Barz et al. ................... 296/187 |
| 6,471,285 B1 | 10/2002 | Czaplicki et al. ........... 296/188 |
| 6,474,722 B1 | 11/2002 | Barz .......................... 296/187 |
| 6,474,723 B1 | 11/2002 | Czaplicki et al. ........... 296/188 |
| 6,475,577 B1 | 11/2002 | Hopton et al. ............. 428/34.7 |
| 6,478,367 B1 | 11/2002 | Ishikawa ............... 296/203.03 |
| 6,482,486 B1 | 11/2002 | Czaplicki et al. ........ 428/36.91 |
| 6,494,525 B1 | 12/2002 | Blank ......................... 296/187 |
| 6,502,821 B1 | 1/2003 | Schneider ................ 276/146.6 |
| 6,519,854 B1 | 2/2003 | Blank ........................ 29/897.1 |
| 6,546,693 B1 | 4/2003 | Wycech ..................... 52/790.1 |
| 6,550,847 B1 | 4/2003 | Honda et al. ............. 296/146.6 |
| 6,561,571 B1 | 5/2003 | Brennecke .................. 296/187 |
| 6,573,309 B1 | 6/2003 | Reitenbach et al. ........ 521/135 |
| 6,575,309 B1 | 6/2003 | Chiga ......................... 210/435 |
| 6,607,238 B1 | 8/2003 | Barz ........................... 296/187 |
| 6,619,727 B1 | 9/2003 | Barz et al. ............. 296/203.02 |
| 6,630,221 B1 | 10/2003 | Wong ......................... 428/117 |
| 6,649,243 B1 | 11/2003 | Robert et al. ................. 428/99 |
| 6,668,457 B1 | 12/2003 | Czaplicki .................... 29/897.1 |
| 6,739,641 B1 | 5/2004 | McLeod et al. ........... 296/37.2 |
| 6,787,579 B1* | 9/2004 | Czaplicki et al. ............. 521/54 |
| 2002/0033617 A1 | 3/2002 | Blank ......................... 296/187 |
| 2002/0036338 A1 | 3/2002 | Matsuo et al. .............. 257/686 |
| 2002/0053179 A1 | 5/2002 | Wycech ..................... 52/721.4 |
| 2002/0074083 A1 | 6/2002 | Ludin et al. ................ 156/293 |
| 2002/0074827 A1 | 6/2002 | Fitzgerald et al. .......... 296/188 |
| 2002/0094427 A1 | 7/2002 | Edwards et al. ......... 428/297.4 |
| 2002/0096833 A1 | 7/2002 | Czaplicki et al. ........... 277/316 |
| 2002/0115736 A1 | 8/2002 | Koshy ........................ 521/99 |
| 2002/0125739 A1 | 9/2002 | Czaplicki et al. ........... 296/187 |
| 2002/0148198 A1 | 10/2002 | Wycech ..................... 52/790.1 |
| 2002/0164450 A1 | 11/2002 | Lupini et al. .................. 428/99 |
| 2002/0174954 A1 | 11/2002 | Busseuil et al. ............. 156/349 |
| 2002/0178584 A1 | 12/2002 | Wycech ...................... 29/897.2 |
| 2002/0192387 A1 | 12/2002 | Agarwal et al. ......... 427/407.1 |
| 2003/0001410 A1 | 1/2003 | Cate et al. ................... 296/187 |
| 2003/0001469 A1 | 1/2003 | Hankins et al. ........... 312/257.1 |
| 2003/0018095 A1 | 1/2003 | Agarwal ....................... 521/59 |
| 2003/0099826 A1 | 5/2003 | Juras et al. .................. 428/343 |
| 2003/0102686 A1 | 6/2003 | McLeod et al. ........... 296/37.2 |
| 2003/0102687 A1 | 6/2003 | McLeod et al. ........... 296/37.2 |
| 2003/0127844 A1 | 7/2003 | Gloceri et al. .............. 280/788 |
| 2003/0137162 A1 | 7/2003 | Kropfeld ............... 296/203.01 |
| 2003/0184121 A1 | 10/2003 | Czaplicki et al. ....... 296/187.02 |
| 2003/0209921 A1 | 11/2003 | Coon et al. ............. 296/187.02 |
| 2004/0266899 A1* | 12/2004 | Muenz et al. ............... 521/135 |

FOREIGN PATENT DOCUMENTS

| | | |
|---|---|---|
| EP | 0 827 473 B1 | 11/1996 |
| EP | 0 897 439 B1 | 11/1997 |
| EP | 0 899 300 A2 | 8/1998 |
| EP | 1 020 273 A1 | 7/2000 |
| EP | 1 364 862 A2 | 4/2003 |
| WO | 99/08854 | 2/1999 |
| WO | 00/13876 | 3/2000 |
| WO | 00/27920 | 5/2000 |
| WO | 00/55444 | 9/2000 |
| WO | 01/34453 A1 | 5/2001 |
| WO | 01/41950 A2 | 6/2001 |
| WO | 01/41950 A3 | 6/2001 |
| WO | 01/54936 A1 | 8/2001 |
| WO | 01/56845 A1 | 8/2001 |
| WO | 01/68342 A1 | 9/2001 |
| WO | 01/41950 A2 | 12/2001 |
| WO | 02/12026 A1 | 2/2002 |
| WO | 02/24451 A1 | 3/2002 |
| WO | 02/26549 A1 | 4/2002 |
| WO | 02/26550 A1 | 4/2002 |
| WO | 02/31077 A2 | 4/2002 |
| WO | 02/31077 A3 | 4/2002 |
| WO | 02/36338 A1 | 5/2002 |
| WO | 02/49836 A1 | 6/2002 |
| WO | 02/074608 A1 | 9/2002 |
| WO | 02/074609 A1 | 9/2002 |
| WO | 02/087843 A1 | 11/2002 |
| WO | 02/088214 | 11/2002 |

OTHER PUBLICATIONS

Derwent 2003-124835, JP2002362412.
Derwent 2000-340652, EP 999119A2.
U.S. Appl. No. 10/794,909, Michelle Boven et al., filed Mar. 5, 2004, Structural Reinforcement Article and Process for Preparation Thereof.
Patent Abstracts of Japan, JP 59077973.

* cited by examiner

HEAT ACTIVATED EPOXY ADHESIVE AND USE IN A STRUCTURAL FOAM INSERT

CROSS REFERENCE TO RELATED APPLICATION

This application claims the benefit of U.S. Provisional Application No. 60/436,888, filed Dec. 27, 2002.

BACKGROUND OF THE INVENTION

The present invention relates to a heat activated epoxy adhesive and its use in a foam insert that is bonded to a metal body. Structural foam inserts (SFIs) have been developed to reinforce structures within motor vehicles to add strength and stiffness to the vehicle at the site of insertion. Acoustical foam inserts (AFI) have been developed to reduce the impact of noise and vibration on vehicle passages. For example, an SFI coated with an uncured expandable epoxy adhesive is secured to the B-pillar cavity of an automobile. An AFI is typically placed in a hollow part of an automobile for the purpose of preventing the transmission of noise and vibration throughout the hollow cavity. AFI may comprise a foam coated with an expandable adhesive. The automobile body is then subjected to electrodeposition coating (e-coating) and bake, whereupon the epoxy adhesive expands through heat activation to form a bond between the foam insert and the sheet metal. However, one problem associated with expandable adhesives of the prior art is their propensity to crosslink before they expand. This premature crosslinking results in ineffective wet-out of the vehicular substrate and concomitant weaker bonding. Furthermore, solving the problem of premature crosslinking—for example, by reducing or eliminating catalyst—creates another problem, namely, the formation of a cured expanded polymer with acceptable adhesion at the expense of large voids (number weighted mean diameter of >2000 μm), the formation of which decreases durability and results in reduction in mechanical properties.

It would therefore be an advance in the art of foam inserts to provide an expandable adhesive for the insert that efficiently wets out a substrate before crosslinking occurs, thereby creating optimal chemical bonding and enhanced durability, but which produces small voids, thereby resulting in enhanced mechanical properties.

The adhesive of the present invention can expand up to 350 percent. To insure the cavity is filled, expansion is limited by the available space in the cavity. The adhesive present invention creates an equalizing pressure which helps align the part in the cavity.

SUMMARY OF THE INVENTION

The present invention addresses a need in the art by providing an expandable adhesive comprising a) a cured 1-part epoxy resin; b) a viscosity increasing agent; and c) not greater than 25 parts by weight of an inorganic filler, based on 100 parts of the epoxy resin, wherein the adhesive when expanded contains voids having a number average or weighted mean diameter of less than 1000 μm.

In a second aspect, the invention is a structural foam insert comprising a) an expanded polymer, and b) an expandable adhesive contacting the expanded polymer, which expandable adhesive contains i) a 1-part epoxy resin; ii) a polymeric viscosity enhancing agent; iii) a blowing agent; iv) a catalyst; and v) a curing agent, wherein the expandable adhesive has a Young's modulus of at least 500 mPa at 100% expansion, preferably 600 mPa at 150 percent expansion.

In a third aspect, the present invention is a reinforced vehicular frame comprising a) an expanded polymer, and b) an expanded adhesive bonding the expanded polymer and the vehicular frame, which expanded adhesive contains i) 1-part cured epoxy resin; and ii) a polymeric viscosity enhancing agent; wherein the expanded adhesive has a Young's modulus of at least 500 MPa at 100% expansion.

In a fourth aspect, the present invention is a method of preparing foam insert comprising the steps of 1) contacting an expandable adhesive with an expanded polymer under conditions sufficient to gel the expandable adhesive without crosslinking; b) placing the expanded polymer with the gelled expandable adhesive within a vehicular frame; c) heat activating the expandable adhesive to create a expanded adhesive that forms a bond between the expanded polymer and the vehicular frame; d) curing the expanded adhesive; wherein the expandable adhesive contains i) a 1-part epoxy resin; ii) a polymeric viscosity enhancing agent; iii) a blowing agent; iv) a catalyst; and v) a curing agent, and wherein the expanded adhesive contains voids having a number weighted mean diameter of <1000 μm.

In a fifth aspect, the present invention is an expanded adhesive comprising a) a cured 1-part epoxy resin; b) a viscosity increasing agent; and c) not greater than 25 parts by weight of an inorganic filler, based on 100 parts of the epoxy resin, wherein the expanded adhesive contains voids having a number weighted mean diameter of <1000 μm.

The present invention addresses a problem in the art by providing an foam insert with an adhesive that efficiently wets out a substrate before crosslinking occurs, thereby creating superior chemical bonding and enhanced durability, but which produces reduced cell structure, thereby resulting in enhanced mechanical properties. The adhesive of the present invention can expand up to 350 percent. To insure the cavity is filled, expansion is limited by the available space in the cavity. The adhesiveof the present invention creates an equalizing pressure which helps align the part in the cavity.

DETAILED DESCRIPTION OF THE INVENTION

The expanded polymer (also known as a rigid foam) used to make the foam insert has a Young's modulus of preferably at least 200 MPa, more preferably at least 350 MPa; a $T_g$ of preferably at least 50° C. and more preferably at least 80° C. and a density of less 1 g/cm$^3$, more preferably less than 0.7 g/cm$^3$ and preferably at least 0.0016 g/cm$^3$ and more preferably at least 0.08 g/cm$^3$, even more preferably at least 0.3 g/cm$^3$. The expanded polymer can be any expanded polymer with dimensional stability when expanded and which provides structural integrity or acoustical sealing properties. Preferred examples of expanded polymers include expanded polyurethane, expanded polystyrene, expanded polyolefin, and expanded 2-part epoxy. A more preferred expanded polymer is an expanded polyurethane. The dimension of the expanded polymer is designed to be 3–6 mm smaller in each dimension than the size of the cavity to which it is to be inserted.

The one part adhesive comprises any one part adhesives which expands and bonds to the expanded foam and the material from which the interior of the vehicle cavity is made. The expandable adhesive that is used to coat the expandable polymer is prepared using a 1-part epoxy resin formulation. Preferred epoxy resins include diglycidyl ethers of bisphenol A and bisphenol F, as well as oligomers of diglycidyl ethers of bisphenol A and bisphenol F, either alone or in combination. More preferably, the epoxy resin is a mixture of diglycidyl ether of bisphenol A and an oligomer of diglycidyl ether of bisphenol A. The epoxy resin preferably constitutes from about 40 weight percent to about 80 weight percent of the total materials used to make the expandable adhesive.

The polymeric viscosity increasing agent is a polymer that increases the viscosity of the blend used to make the expandable adhesive to control the release and coalescence of gases produced by the blowing agent. The viscosity increasing agent is preferably used as a fine powder (volume mean average <200 µm) and preferably has a $T_g$ of at least 70° C. more preferably at least 100° C. Examples of polymeric viscosity increasing agents include polyvinyl butyrates; phenoxy resins, polystyrene, polycarbonates and polymeric acrylates and methacrylates and polyvinyl formal. Examples of more preferred polymeric viscosity increasing agents include polymeric acrylates and methacrylates, more preferably polymethylmethacrylate (PMMA), most preferably a carboxylic acid functionalized PMMA such as the commercially available Degalan™ 4944F PMMA (available from Rohm America). The polymeric viscosity increasing agent is used in an effective amount to control release of gas from the blowing agent so as to reduce cell size in the resultant cured resin. The concentration of the polymeric viscosity increasing agent is preferably at least 2, more preferably at least 5, and most preferably at least 10 weight percent; and preferably not more than 40 weight percent, more preferably not more than 30 weight percent, and most preferably not more than 20 weight percent, based on the total materials used to make the expandable adhesive.

The polymerization of the epoxy resin is catalyzed by an effective amount of a polymerizing promoting catalyst, preferably from about 0.1 weight percent to about 2 weight percent, based on the total materials used to make the expandable adhesive. Suitable catalysts include, but are not restricted to, ureas and imidazoles. An example of a preferred catalyst is Acclerine CEL 2191 (1-(2-(2-hydroxbenzamido)ethyl)-2-(2-hydroxyphenyl-2imidazoline, which has the following chemical structure:

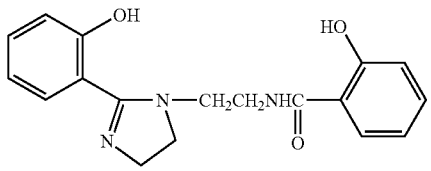

The preparation of this catalyst is described by Bagga in U.S. Pat. No. 4,997,951, which description is incorporated herein by reference.

The epoxy resin is expanded to a desired volume in the presence of an effective amount of a blowing agent to achieve the desired foam structure and density, preferably from about 0.5 weight percent to about 10 weight percent, more preferably from about 0.5 to about 3 weigh percent, and most preferably from about 1 to about 2 weight percent, based on the total materials used to make the expandable adhesive. Preferred blowing agents are heat activatable at least about 100° C. more preferably at least about 120° C. and preferably not greater than about 160° C. Examples of suitable blowing agents include those described by Fukui in U.S. Pat. No. 6,040,350, column 4, lines 25–30, which section is incorporated herein by reference. An example of a preferred commercially available blowing agent is Celogen AZ™ 120 azodicarbonamide (both from Crompton).

The expandable adhesive may further comprise a known rheology control agent such as fumed silica. Surfactants can also be used in the expandable adhesives, such as silane or titanate based surfactants.

The epoxy resin is cured with an effective amount of a curing agent, preferably from about 2 to about 10 weight percent, based on the total materials used to make the expandable adhesive. Examples of suitable curing agents include those described by Fukui in column 4, line 66–67 and column 5, lines 1–9, which sections are incorporated herein by reference.

Preferred curing agents include dicyandiamide such as AMICURE CG-1200 (from Air Products).

A sufficient amount of curing agent is used to form the desired foam structure and to provide dimensional stability, preferably about 2 or greater of weight percent, even more preferably about 3 weight percent or greater, and most preferably about 4 weight percent or greater, and preferably about 10 weight percent or less, even more preferably about 8 weight percent or less and most preferably about 6 weight percent or less.

The expandable adhesive may also include any filler which has a small enough particle size for mixing may be used. The filler may be organic or inorganic. Among preferred organic fillers are polyethylene, polypropylene, polyurethane, rubber and polyvinyl butyral. Among preferred inorganic fillers are calcium carbonate, talc, silica, calcium metasilicate aluminum, hollow glass spheres, and the like. More preferred organic fillers are polyolefin polymeric fillers, such as a polyethylene copolymers. More preferred inorganic fillers include calcium carbonate. The amount of filler is preferably not greater than 25 parts by weight, more preferably not greater than 15 parts by weight, and most preferably not greater than 10 parts by weight, relative to 100 parts by weight of the epoxy resin used to make the expandable adhesive.

A preferred expandable adhesive is prepared by combining and mixing the epoxy resin, the blowing agent, the catalyst, the curing agent, the viscosity increasing agent, and optionally the fillers at a temperature above ambient temperature, preferably from about 30° C. to about 50° C. for about 15 minutes to about 2 hours. Entrapped air is removed in vacuo and the expandable adhesive is then injected into a hot mold (about 100° C. to about 130° C.) that surrounds and conforms to the shape of the expanded polymer to achieve variable designed thicknesses of adhesive over the expanded polymer ranging from about 1 mm to about 4 mm. The resultant foam insert is affixed within a cavity of an automotive structure so as to create about a 1-mm to about a 4-mm gap between the foam insert and the metal substrate. The metal structure is then e-coated, with residual e-coat liquid escaping through the gaps between foam insert and the metal. Finally, the e-coat and expandable adhesive are cured at a suitable curing temperature, preferably between about 150° C. and about 200° C.

The preferred cured (expanded) adhesive has a Young's modulus of at least 500 MPa, more preferably at least 700 MPa, and most preferably of at least 1000 MPa at 100% expansion. Furthermore, the preferred cured adhesive has surprisingly small voids, preferably with a number weighted mean diameter of less than 1000 µm, more preferably less than 500 µm, and most preferably less than 100 µm. Consequently, the adhesion of the foam insert to the automotive structure is strong and durable.

The following example is for illustrative purposes only and is not intended to limit the invention in any way. All percentages are weight percent unless otherwise specified.

EXAMPLE

Preparation of a Structural Foam Insert with Controlled Adhesive Cell Size

A rigid polyurethane foam having a density of 0.64 g/cm$^3$ and a Young's modulus of 400 MPa is conformed to a desired shape. An expandable adhesive is prepared by adding to a vessel with mixing DER 331 epoxy resin (40%), DER 337 epoxy resin (25%), CELOGEN AZ 120 blowing agent (1.5%), CaCO$_3$ filler (0.45%), carbon black (0.9%), ACCELERINE CEL 2191 catalyst (1%, obtained from Celerity LLC), AMICURE CG1200 dicydiamide, DEGALAN 4944F PMMA (12.1%), MICROTHENE FE-532 polyethylene copolymer (10%), and CABOSIL TS-720 (4.1%) at 40° C. for 1 hour. Entrapped air is then removed by mixing under vacuum for 30 minutes. The blend is injected into a hot mold (120° C.) surrounding and conforming to the shape of a polyurethane foam insert so that the expandable adhesive substantially covers the insert to achieve variable designed thicknesses ranging from 2–3 mm for designed variances in final mechanical properties of the expanded adhesive. The adhesive resides in the hot mold for 4 minutes, after which the mold is cooled to about room temperature over a 10-minute period and removed. The resultant FOAM INSERT is affixed within the cavity of an automotive structure to create about a 2-mm gap between the SFI and the metal substrate. The metal structure is e-coated at ambient temperatures, with the residual liquid running through the gaps between the SFI and the metal. The structure is heated in an oven for 40 minutes at about 180° C. to cure the e-coat and to expand and cure the adhesive. The cured adhesive has a Young's modulus of about 1033 MPa at 100% expansion.

What is claimed is:

1. An expandable adhesive comprising a) a 1-part epoxy resin; b) a viscosity increasing agent comprising a carboxylic acid functionalized polymethylmethacrylate having a Tg of at least 100 ° C.: c) a filler, d) a curing agent and e) a catalyst comprising an urea or imidazole, and f) a blowing agent, wherein the adhesive is capable of expansion of at least 150 percent and when expanded contains voids having a number weighed mean diameter of less than 1000 μm.

2. An expandable adhesive according to claim 1 wherein the viscosity increasing agent is a carboxylic acid functionalized polymethylmethacrylate powder.

3. An expandable adhesive according to claim 1 wherein the curing agent is present in an amount of about 2 to about 10 percent by weight and the catalyst is present in an amount of about 0.1 to about 2 percent by weight based on the adhesive composition.

4. An expandable adhesive according to claim 3 wherein the catalyst is 1-(2-(2-hydroxybenzamido)ethyl)-2-(2-hydroxyphenyl-2-imidazoline).

5. An expandable adhesive according to claim 3 wherein the epoxy resin is present in the expandable adhesive in an amount of about 40 to about 80 weight percent based on the weight of the total materials used to prepare the expandable adhesive; the polymeric viscosity increasing agent is present in an amount of at least about 2 to not more than about 40 weight percent based on the weight of the total materials used to prepare the expandable adhesive; and the filler is present in an amount of not greater than about 25 parts by weight based on 100 parts by weight of the epoxy resin.

6. An expandable adhesive according to claim 5 wherein the viscosity increasing agent is a fine powder having a volume mean average of less than about 200 μm and a Tg of at least 70° C.

7. An expandable adhesive according to claim 5 wherein the blowing agent is heat activatable at a temperature of at least about 100° C.

8. An expandable adhesive according to claim 7 wherein the blowing agent is present in an amount of about 0.5 to about 10 weight percent based on the total materials used to make the expandable adhesive.

9. An expandable adhesive according to claim 7 wherein the composition further comprises a rheology control agent.

10. An expandable adhesive according to claim 7 further comprising a surfactant.

11. An expandable adhesive according to claim 1 wherein the composition is capable of forming a foam having a density less than about 1 g/cm$^3$, a Tg of at least about 50° C. and a Young's modulus of at least about 200 mPa.

12. An expandable adhesive according to claim 1 wherein the filler is polyethylene, polypropylene, polyurethane, rubber or polyvinyl butyral.

* * * * *

UNITED STATES PATENT AND TRADEMARK OFFICE
CERTIFICATE OF CORRECTION

| | | |
|---|---|---|
| PATENT NO. | : 7,084,210 B2 | Page 1 of 1 |
| APPLICATION NO. | : 10/738668 | |
| DATED | : August 1, 2006 | |
| INVENTOR(S) | : Glenn G. Eagle | |

It is certified that error appears in the above-identified patent and that said Letters Patent is hereby corrected as shown below:

Column 5, line 43, "100°C.:" should read -- 100°C.; --.

Signed and Sealed this

Third Day of April, 2007

JON W. DUDAS
*Director of the United States Patent and Trademark Office*